United States Patent [19]

Ohniwa

[11] Patent Number: 4,459,926
[45] Date of Patent: Jul. 17, 1984

[54] INDUSTRIAL AUTOMATIC PATTERN STITCHING MACHINE

[75] Inventor: Kohichi Ohniwa, Aichi, Japan

[73] Assignee: Mitsubishi Denki Kabushiki Kaisha, Tokyo, Japan

[21] Appl. No.: 367,515

[22] Filed: Apr. 12, 1982

[30] Foreign Application Priority Data

Apr. 10, 1981 [JP] Japan .................................. 56-53930

[51] Int. Cl.³ ............................................ D05B 21/00
[52] U.S. Cl. ............................................... 112/121.12
[58] Field of Search .................... 112/121.12, 220, 221, 112/158 E, 262.1, 102, 103, 121.11, 266.1

[56] References Cited

U.S. PATENT DOCUMENTS 4,309,950 1/1982 Franklin ..................... 112/121.12 X
4,391,211 7/1983 Yamamoto et al. ............. 112/121.12

Primary Examiner—Peter P. Nerbun
Attorney, Agent, or Firm—Sughrue, Mion, Zinn, Macpeak and Seas

[57] ABSTRACT

An industrial automatic pattern stitching sewing machine in which the speed of a cloth holder feeding cloth at a sewing needle is limited to a predetermined maximum speed in any direction so that the movement of the cloth holder is always in synchronization with that of the sewing needle. With this arrangement, pattern irregularities and jamming caused by nonsynchronization between the cloth holder and sewing needle are eliminated. Pulse numbers from a stored stitching pattern are examined to determine which of the X and Y pulse numbers is the larger. The larger of these is compared with a stored maximum value. If the larger number is less than the stored value, the two pulse numbers are outputted directly. Otherwise, at least one of them is limited to the maximum value.

6 Claims, 8 Drawing Figures

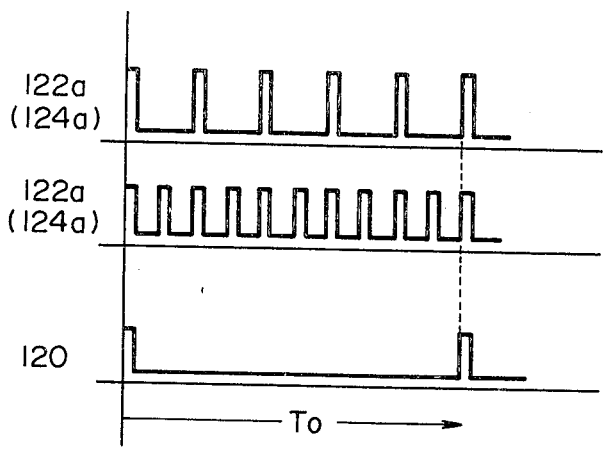
FIG. 5A
FIG. 5B
FIG. 5C
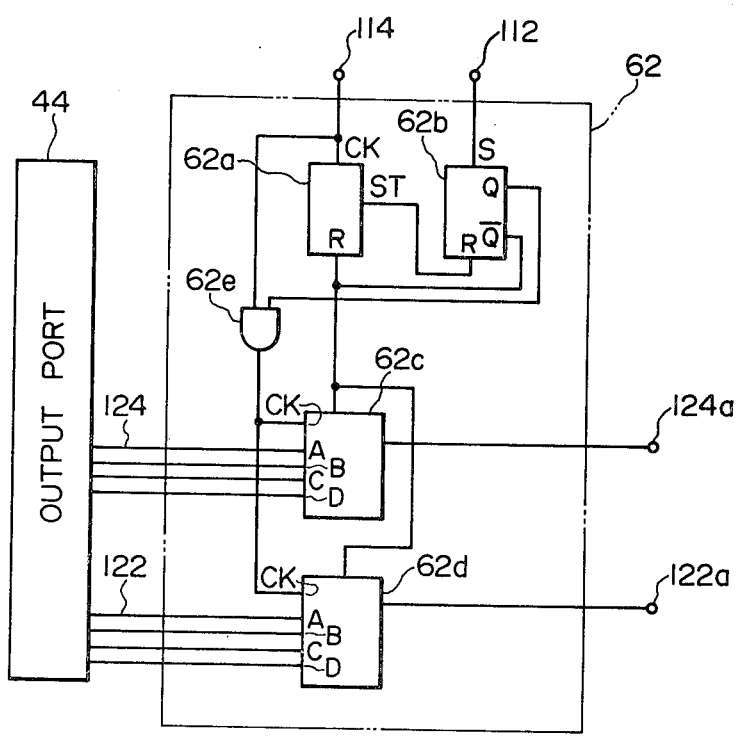
FIG. 6

INDUSTRIAL AUTOMATIC PATTERN STITCHING MACHINE

BACKGROUND OF THE INVENTION

The present invention relates to an industrial automatic sewing machine. More particularly, the invention relates to a computer controlled pattern stitching machine wherein a cloth holder is moved by pulse motors in a pattern based on a stitching pattern which has been stored in a memory.

Pattern stitching machines can stitch a selected pattern accurately and quickly, thereby raising the level of operational efficiency in the stitching process compared with a manual machine. A pattern stitching machine which stitches a pattern while the cloth holder is moved by a pulse motor based on a stitching pattern previously stored in memory has many advantages. These include the facts that any of a number of stitching patterns stored in memory can be easily selected, the stitching patterns can be varied as desired by changing the contents in memory or by changing the memory itself, and enlarged or reduced stitching patterns can easily be stitched, as well as other advantages.

With this type of pattern stitching machine, irregular patterns may be formed on the cloth if the movement of the pulse motor is not synchronized with that of the sewing needle. The sewing needle may in fact strike the cloth holder if the movement of the pulse motor is far enough out of synchronization with that of the sewing needle. Specifically, this can occur if the pulse motor is driven at such a high speed that the torque thereof is greatly reduced so that the pulse motor cannot drive the cloth holder at the feeding speed necessary to synchronize with the sewing needle. This phenomenon is primarily of concern during enlarged pattern stitching where the cloth feeding rate is high and the pulse motor is driven at a high speed.

SUMMARY OF THE INVENTION

The invention is intended to solve the problems described above associated a conventional pattern stitching machine. An object of this invention is thus to provide such an industrial pattern stitching machine in which movement of the cloth holder feeding the cloth is always synchronized with that of the sewing needle.

In order to achieve the above-described and other objects, a pattern stitching machine of the invention is provided with a memory in which an appointed stitching pattern is stored. The sewing machine head stitches the desired pattern on the cloth while the movement of the cloth holder holding the cloth is controlled in accordance with a stitching pattern stored in the memory. A sewing machine control section controls the sewing machine head with a speed corresponding to sewing machine instructions. If an attempt is made to exceed a predetermined limit speed of the pulse motor, the sewing machine control section drives the sewing machine below the limit speed within which synchronization can be achieved.

BRIEF DESCRIPTION OF THE DRAWINGS

FIGS. 5A–5C are diagrams illustrating waveforms of control signals used to control the operation of the sewing machine shown in FIG. 1; and FIG. 6 is a schematic diagram showing details of a portion of the sewing machine control circuitry of FIG. 1;

DESCRIPTION OF THE PREFERRED EMBODIMENTS

A preferred embodiment of the invention will be described with reference to the drawings.

Figure 1:
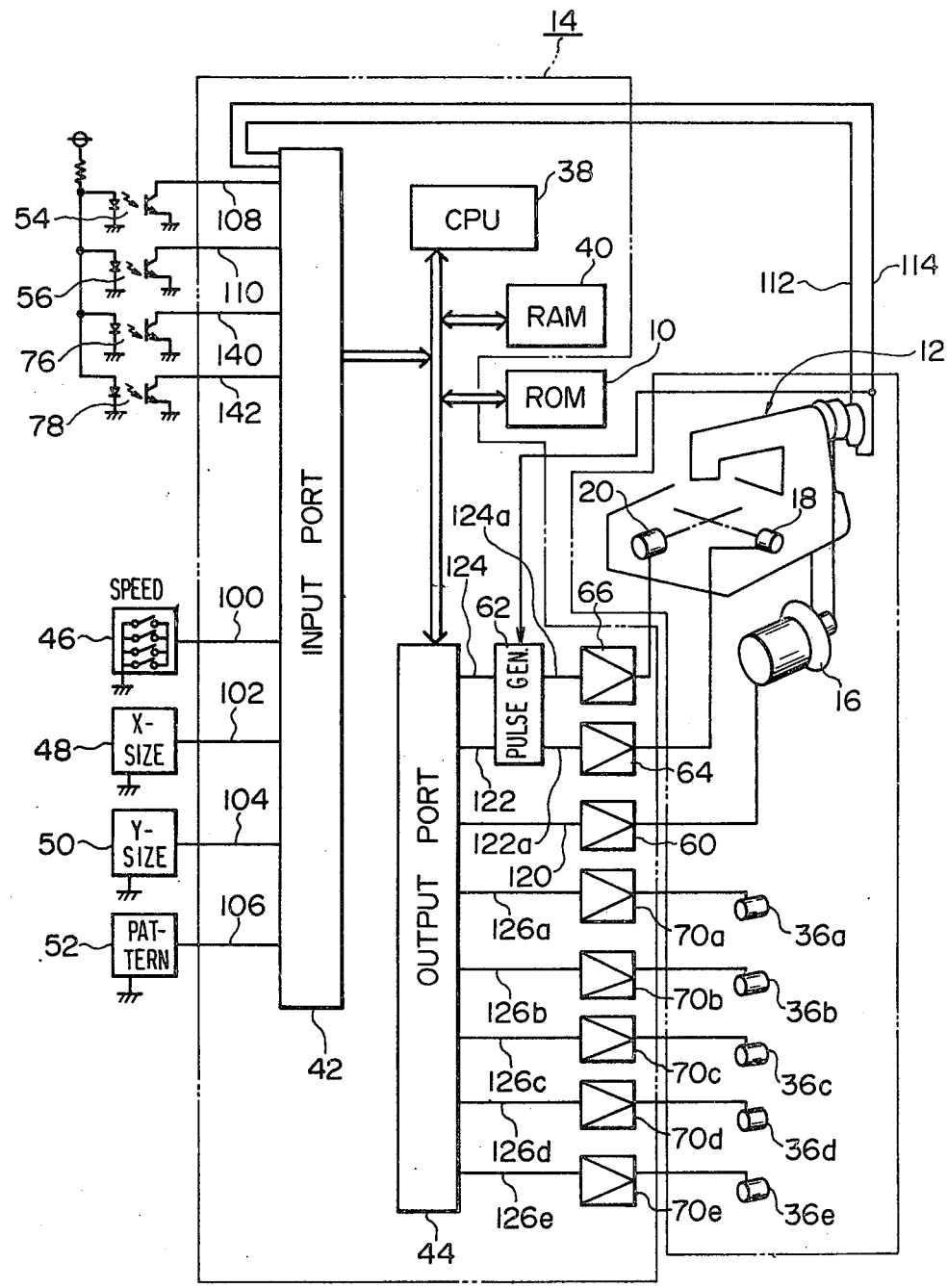
FIG. 1 is a schematic view illustrating a sewing machine constructed in accordance with a preferred embodiment of the present invention.

FIG. 1 shows schematically the structure of a preferred embodiment of a sewing machine constructed according to the present invention. The embodiment shown in FIG. 1 includes a PROM (Programmable Read-Only Memory) 10 in which are stored predetermined stitching patterns, the sewing machine head 12 which performs stitching along the patterns which are stored in the PROM 10, and a sewing machine control section 14 which controls the driving of the sewing machine head 12.

A main shaft of the sewing machine head 12 is driven by a driving motor 16. Cloth is stitched using the driving torque of the sewing machine driving shaft.

Figure 2:
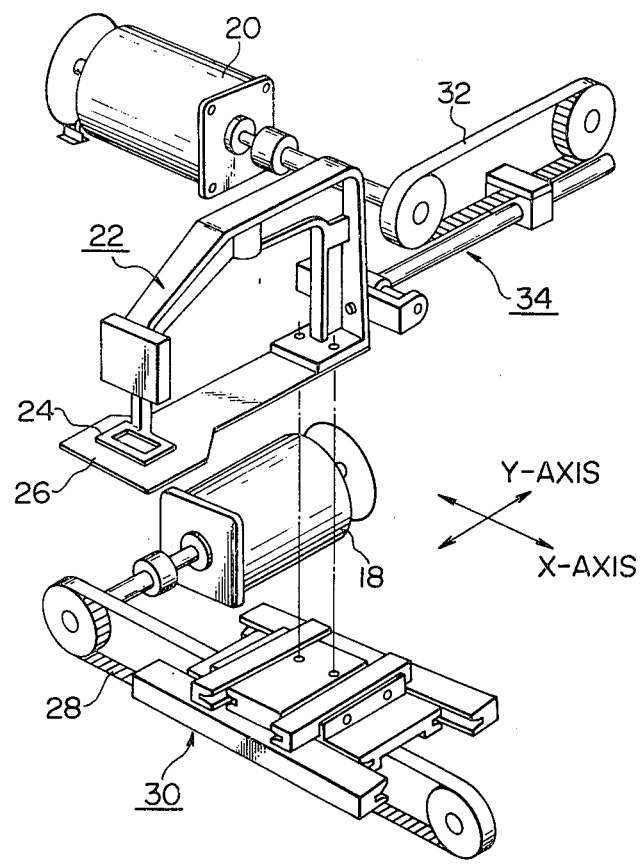
FIG. 2 is a perspective view illustrating a cloth feeding mechanism used in the sewing machine of FIG. 1.

The sewing machine head 12 stitches a pattern while a cloth holder feeds cloth in the horizontal direction. As shown in FIG. 2, the cloth to be stitched is held between the upper cloth retainer 24 of a cloth holder 22 and a lower cloth retainer 26 on a sewing machine table. The cloth holder 22 is moved in the X direction by a pulse motor 18 through a feed transmission 30 including a driving belt 28 and moved in the Y direction by a pulse motor 20 through a feed transmission 34 including a driving belt 32.

Further, in FIG. 1, the sewing machine head 12 has electromagnets 36a–36e for driving a cloth presser, for separating one thread from others, for trimming the thread, for pulling the thread, and for loosening the thread, respectively. If any of the electromagnets 36 are driven, the cloth is released from the cloth holder 22 or is held between the cloth holder 22 and the lower cloth retainer 26 so that the thread can be separated, trimmed, pulled or loosened.

The sewing machine control section 14 will now be described in detail. As described above, the sewing machine control device is used to control the sewing machine head 12. The sewing machine control device includes a CPU (Central Processing Unit) 38 which calculates and outputs control signals and a RAM (Random Access Memory) 40 used by the CPU for calculations and operations thereof. In the sewing machine control section 14, input signals are inputted to a calculation device including the CPU 38 and the RAM 40 through an input port 42 while output signals are outputted from the calculating device through an output port 44.

The sewing speed is changeable at several stages in the sewing machine. In one instance, a sewing speed instruction 100 is inputted at the input port 42. This sewing speed instruction 100 is produced by a sewing speed instruction circuit 46 which is implemented with a number of switches. The sewing speed is set by operating the switches of the sewing speed instruction circuit 46. An X-axis enlarging or reducing instruction 102 and a Y-axis enlarging or reducing instruction 104 are supplied to the input port 42 in response to which a pattern is enlarged or reduced in either or both of the X-axis and Y-axis directions selectively. The enlarging and reducing instructions 102 and 104 are outputted from respective enlarging and reducing ratio setting circuits 48 and 50, each also implemented with plural switches. The desired enlarging or reducing ratio is set by operating selected switches of the enlarging and reducing instruction circuits 48 and 50.

As previously mentioned, plural stitching patterns are stored in the PROM 10. A pattern selecting instruction 106 is supplied to the input port 42 with which an operator can freely select a desired pattern from the PROM 10. The selecting instruction 106 is outputted from a pattern selecting instruction circuit 52, again composed of plural switches. A desired one of the patterns in the PROM 10 is selected by operating the switches of the pattern selecting instruction circuit 52.

To the input port 42 is supplied an instruction 108 for moving the upper cloth retainer 24 up and down, an instruction 110 for starting the sewing machine, a needle position detecting signal 112, and a sewing speed detecting signal 114.

Instructions 108 and 110 are produced, respectively, by photo-interrupters 54 and 56, which are turned on and off by a cooperating pedal. When the pedal is not depressed, the instruction 108 for lifting up the upper cloth retainer 24 is outputted, when the pedal is slightly depressed, the instruction 108 is outputted which causes the cloth to be held between the upper cloth retainer 24 and the lower cloth retainer 26 by lowering the upper cloth retainer 24. When the pedal is fully depressed, the instruction 110 for starting the sewing machine is outputted.

The needle position detecting signal 112 and a sewing speed detecting signal 114 are respectively produced by a needle position detector (not shown) and a sewing speed detector (not shown) which are mounted on the sewing machine driving shaft.

Operating instruction signals produced at the output port 44 are used to drive the sewing machine head 12. Specifically, these include a control signal 120 for controlling the driving motor 16, and control signals 122 and 124 for controlling pulse motors 18 and 20.

The control signal 120, which corresponds to the sewing speed instruction 100, is inputted to an amplifier 60 which controls the driving motor 16 with a speed selected by the sewing speed instruction 100. In the sewing machine described, a loop control is operated by the sewing speed detecting signal 114 with which the sewing speed is maintained at a predetermined value.

As described above, in the sewing machine of the invention, a pattern is stitched while the cloth holder 22 feeds the cloth in the horizontal direction on the sewing machine table with the cloth holder 22 being moved by the pulse motors 18 and 20. The control signals 122 and 124 which are used to control the pulse motors 18 and 20 have a pulse pattern correspondin to cloth feeding amounts in the X- or Y-axis directions, which in turn correspond to a desired stitch pattern which the CPU 38 reads out from the PROM 10 in predetermined units. The cloth feeding amounts can be enlarged or reduced by enlarging or reducing instructions 102 and 104.

A sewing speed detecting signal 114 modulates the control signals 122 and 124, in a manner to be described in detail below, in a feed pulse generating circuit 62 which thus converts the control signals to feed control pulse signals 122a and 122b which in turn control the sewing speed. Pulse motors 18 and 20 are driven by amplifiers 64 and 66. The feed control pulses are supplied whenever the sewing needle returns to its uppermost position. Therefore, the cloth holder 22 is fed cloth in the horizontal direction every stitch with a sewing speed corresponding to the desired enlargement or reduction ratio. On the cloth held between cloth holder 22 and lower cloth retainer 24 is formed the desired pattern which is enlarged or reduced at the desired ratio and which has the same stitch interval no matter what the sewing speed.

The detailed construction of the feed pulse generating circuit 62 is shown in the schematic diagram of FIG. 6. In this diagram, reference numeral 62a devotes a counter, 62b a flip-flop, 62c and 62d module-N counters, and 62e an AND gate. In operation, output digital values from the CPU 38 are applied to the counters 62c and 62d on the multiple signal lines 122 and 124. The flip-flop 62d is set by a needle downward movement signal 112. The pulse signal 114 is then counted by the counter 62a. When a predetermined number of pulses has been counted by the counter 62a, the counter 62a produces a count-up signal which resets the flip-flop 62b. So long as the flip-flop 62b is in the set state, cloth is fed. During that time, the AND gate 62e is in the open condition so that the speed signal 114 is allowed to pass therethrough and be applied to the counter 62c and 62d. The counters 62c and 62d then operate to modulate the pulse motor driving signal with the speed signal 114 and to apply the resultant signal to the output terminals 122a and 124a. With this arrangement, a pulse motor driving signal which corresponds to the machine operating speed is provided.

As described above, in a prior art sewing machine of this type, when the cloth holder 22 is fed in the horizontal direction at a high speed, the movement of the pulse motor may not be synchronized with that of the sewing needle. On the other hand, in accordance with the invention, the movement of the pulse motors 18 and 20 is always synchronized with that of the sewing needle.

There is an upper limit speed at which the cloth holder 22 is movable so that the movement of the pulse motors 18 and 20 can be synchronized with that of the sewing needle. Therefore, the distance through which the cloth holder 22 can be moved at any one time instant, and correspondingly the number of feed pulses 122a and 124a, has an upper limit.

Figure 3:
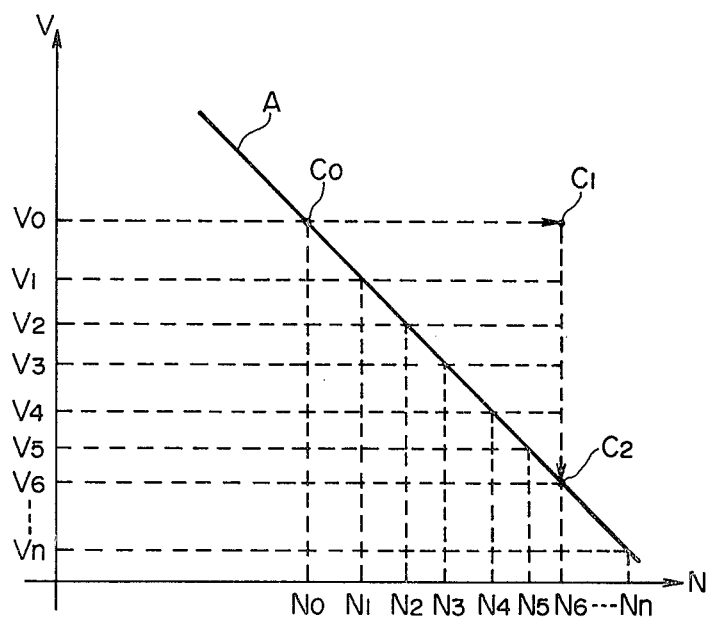
FIG. 3 is a diagram illustrating movements of components of the sewing machine shown in FIG. 1.

This is illustrated graphically in FIG. 3. In FIG. 3, the sewing speed V is plotted on the ordinate and the number N of feed pulses 122a and 124a supplied to the pulse motors 18 and 20 on the abscissa. The line A indicates an upper limit pulse number at which the cloth holder 22 can be moved. Above the limit, that is, in the area of the graph in which the pulse number N is above the line A, the movement of the pulse motors 18 and 20 will not be sychronized with that of the sewing needle.

In the described embodiment of the invention, a representation of the line A and plural sewing speeds $V_0$, $V_1$, $V_2$, . . . $V_n$ as shown in FIG. 3 are stored in the sewing machine control section 14. If an attempt is made to increase the pulse number N to a value beyond the line A, the sewing machine control section 14 shown in FIG. 1 reduces the speed of the pulse motors 18 and 20 and reduces the pulse number N to a value below line A by selecting a lower sewing speed V than that which would otherwise be used. As described above, the feed pulse generating circuit 62 outputs feed pulses 122a and 124a corresponding to the sewing speed so that both the speed of pulse motors 18 and 20 and the sewing speed V are reduced.

Each of the control signals 126a-126e is outputted from the output port 44. Each control signal 126a-126e is respectively supplied to a corresponding amplifier 70a-70e which drive corresponding electromagnets 36a-36e. With this arrangement the sewing machine control device 14 drives the electromagnet 36a corresponding to the pedal depression state as indicated by the instruction 108 and causes the cloth to be released from the cloth holder 22 or to be held between the cloth holder 22 and the lower cloth retainer 26 by raising and lowering the upper cloth retainer 24.

The further operation of the embodiment of the invention will be further described with reference to FIG. 4.

At the start of operations, a power supply switch is turned on and the sewing machine control section 14 is set to an initial state. If the cloth is set on the lower cloth retainer 26 and the pedal is slightly depressed, the cloth is then held between the cloth holder 22 and the lower cloth retainer 26. Then, the cloth holder 22 is moved to the starting point of the pattern whereupon the preparations for stitching are complete.

Next, the sewing speed instruction 100, the enlarging or reducing instructions 102 and 104, and a pattern selecting instruction 106 are inputted to the input port 42. If the pedal is then further depressed, a stitch pattern selected by the pattern selecting instruction 106 is read out from the PROM 10, the cloth holder 22 corresponding to the enlarging or reducing instructions 102 and 104 is fed in the horizontal direction, the sewing machine main shaft is rotated at a speed corresponding to the sewing speed instruction 100, and the desired pattern is then formed stitch-by-stitch on the cloth. When the sewing needle is at a lower position, the cloth is not fed. When the sewing needle is raised to the upper position, the cloth is fed for the next stitch.

The actions described above are for the case where the cloth is stitched at a speed corresponding to the area under the line A in FIG. 3. In accordance with the present invention, the feeding quantity $X_D$ of one stitch in the X-axis direction is always compared with the feeding quantity $Y_D$ of one stitch in the Y axis-direction. The larger one of these two feeding quantities is replaced with a pulse number B, and is in order compared with each pulse number $N_0, N_1, N_2, \ldots$ along the line A, corresponding to the speed at that time.

As described above, in the case that the speed of the pulse motors 18 and 20 is under the limit, the following inequalities are satisfied. $B \leq N_0, B \leq N_1, B \leq N_2, \ldots B \leq N_n$. Therefore, the driving motor 16 is driven with a sewing speed V corresponding to the sewing speed instruction 100, feed pulses 122a and 124b corresponding to the sewing speed V are supplied to pulse motors 18 and 20, and the sewing machine is driven at a speed such that the movement of the pulse motors 18 and 20 is synchronized with that of sewing needle.

A further detailed explanation will be given with reference to FIGS. 5A-5C. It is first assumed that the cloth is stitched at a speed falling below the line A in FIG. 3 with the sewing speed V being $V_0$. The period thereof is $T_0$ as shown in FIG. 5A ($N_{1=6}$).

The case where the pulse number N of the feed pulses 122a and 124a falls above the line A will next be described. The pulse number for that case is compared with the pulse number $N_0, N_1, \ldots N_n$ in order, and a sewing speed $V_0, V_1 \ldots, V_n$ corresponding to the pulse number is selected by the sewing machine control device 14. The sewing machine control section 14 then outputs a control signal 120 corresponding to the selected sewing speed $V_0, V_1, \ldots, V_n$, and the cloth is fed at a speed corresponding to a selected sewing speed $V_0, V_1, \ldots, V_n$. That is, in spite of the sewing speed instruction 100 which would specify a higher pulse number and sewing speed, the cloth is fed by the sewing machine control device 14 at a limit speed $V_0, V_1, \ldots, V_n$ within which the movement of the pulse motors 18 and 20 can be synchronized with that of the sewing needle.

These operations will be further described with reference to the above-described embodiment.

In the case that an instruction 102 (104) requiring that the pattern size be doubled in inputted, the feed pulse number N is doubled to $N_6$ (12). For this case, the feed pulse number N ($=N_6$) is above the line A. That is, the selected driving state is changed from that corresponding to the coordinate point $C_0(N_0, V_0)$ to the coordinate point $C_1(N_6, V_0)$ in FIG. 3. If the pulse motors 18 and 20 were driven at this speed, the movement thereof would not be synchronized with that of the sewing needle. However, in accordance with the invention, the pulse number B is compared with $N_0, N_1, N_2, N_3, N_4$ and $N_5$ in order, and the highest sewing speed $V_6$ which the pulse number B does not exceed, namely, $C_2(N_6, V_6)$, is selected. Consequently, the control signal 120 corresponding to the sewing speed $V_6$ is outputted from the sewing machine control section 14. Therefore, in spite of the sewing speed instruction 100, the sewing machine driving shaft is rotated with a torque corresponding to the sewing speed $V_6$ selected by the sewing machine control section 14, and the pulse motors 18 and 20 are driven at limit speeds which are reduced and which correspond to the reduced sewing speed $V_6$.

Figure 4:
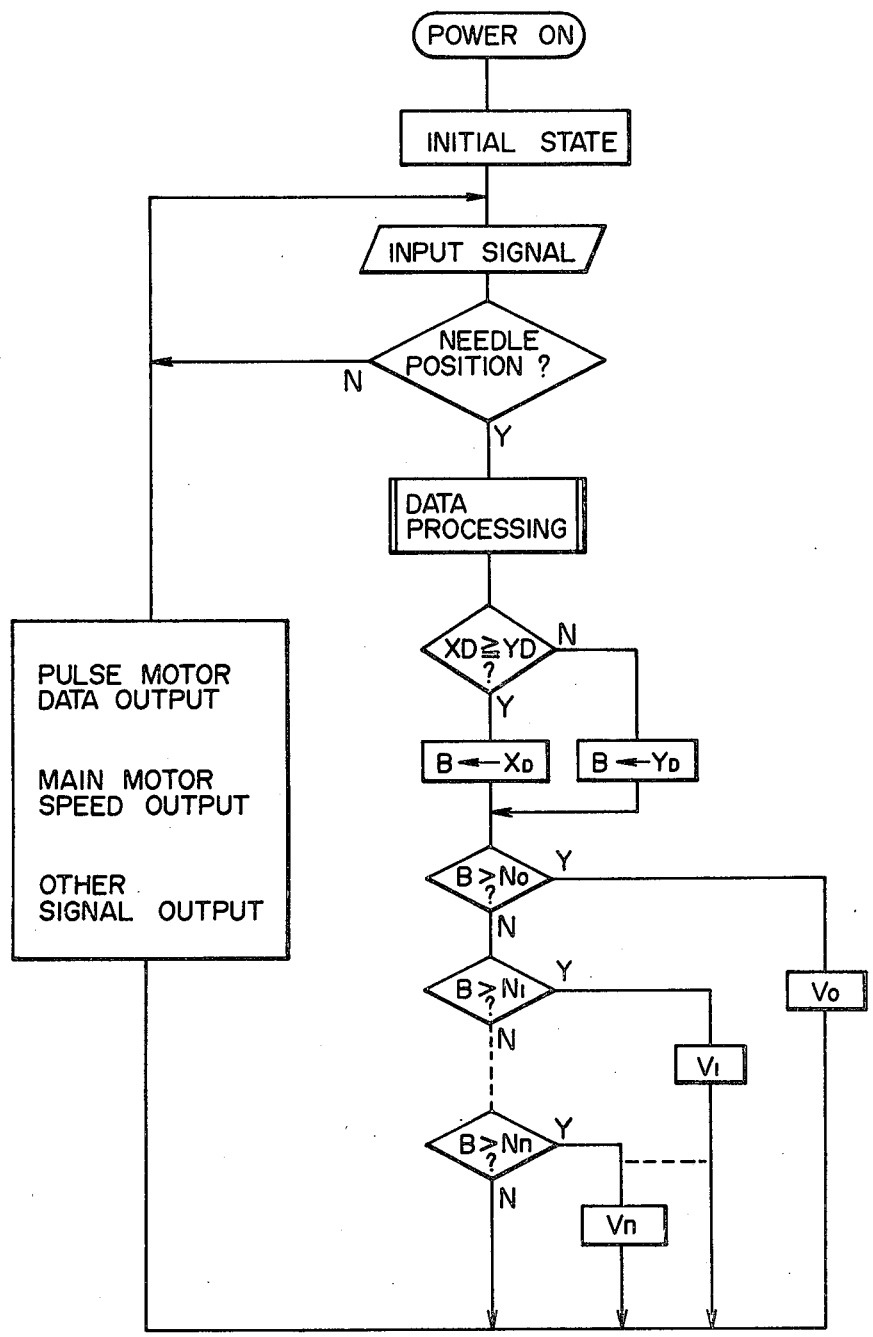
FIG. 4 is a flowchart illustrating the operation of the sewing machine shown in FIG. 1.

The various operation of the CPU 38 are shown in detail in the flowchart of FIG. 4.

As described above, according to the present invention, the pulse motors for cloth feeding are always driven at a speed under the limit speed so that the movement of the pulse motors is maintained synchronized with the movement of the sewing needle. The present invention is advantageous in that clear and perfect patterns are always stitched and the cloth holder will not strike the sewing needle.

What is claimed is:

1. A pattern stitching machine comprising:
    a memory for storing predetermined stitching patterns;
    a sewing machine head for stitching a selected one of said stitching patterns on a cloth, said sewing machine head having a cloth holder and drive means for moving said cloth holder in response to driving pulses; and
    means for determining a number of driving pulses to be supplied to said drive means in response to data from said memory representative of said selected stitching pattern, said control means including means for limiting said pulses applied to said drive means if a speed of said cloth holder would exceed a predetermined limit speed for said data from said selected stitching pattern.

2. The pattern stitching machine of claim 1 wherein said drive means comprises X-axis and Y-axis pulse motors for moving said cloth holder in X and Y directions, respectively, in response to X-axis and Y-axis drive pulses.

3. The pattern stitching machine of claim 2 wherein said control means comprises:
- means for storing a representation of a limit line indicative of limit speeds in X and Y axes;
- means for comparing speeds in X and Y axes determined by said data from said selected stitching pattern with said representation of said limit line;
- means for reducing said speeds determined by said selected pattern if one of said speeds in said X and Y axes is beyond said limit line to a speed within or on said limit line.

4. The pattern stitching machine of claim 3 wherein said data from said selected stitching pattern comprises feed pulse numbers for said X axis and said Y axis.

5. The pattern stitching machine of claim 4 wherein said control means includes:
- means for comparing said pulse numbers in said X and Y axes to determine which of said pulse numbers is larger;
- means for comparing a larger one of said pulse numbers with a predetermined maximum number;
- means for outputting said larger one of said pulse numbers to set a corresponding number of said drive pulses if said larger one of said pulse numbers is less than said predetermined maximum number; and
- means for outputting said predetermined maximum number to set a corresponding number of said drive pulses if said larger pulse number is greater than said predetermined maximum.

6. The pattern stitching machine of claim 5 further comprising X-axis and Y-axis enlarging/reducing control means coupled to said control means for setting an enlarging/reducing ratio in said X and Y axes.

* * * * *